Patented Apr. 17, 1923.

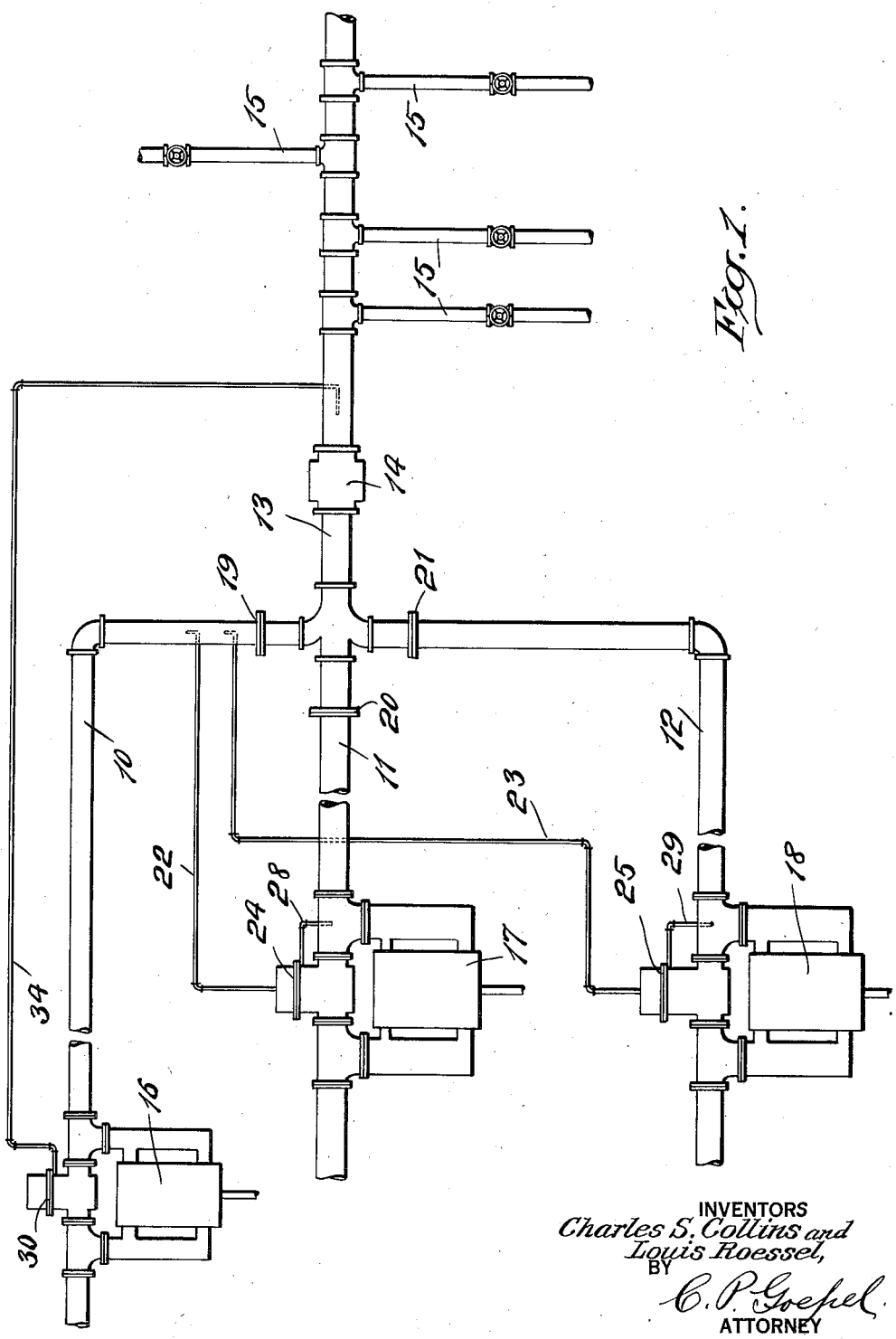

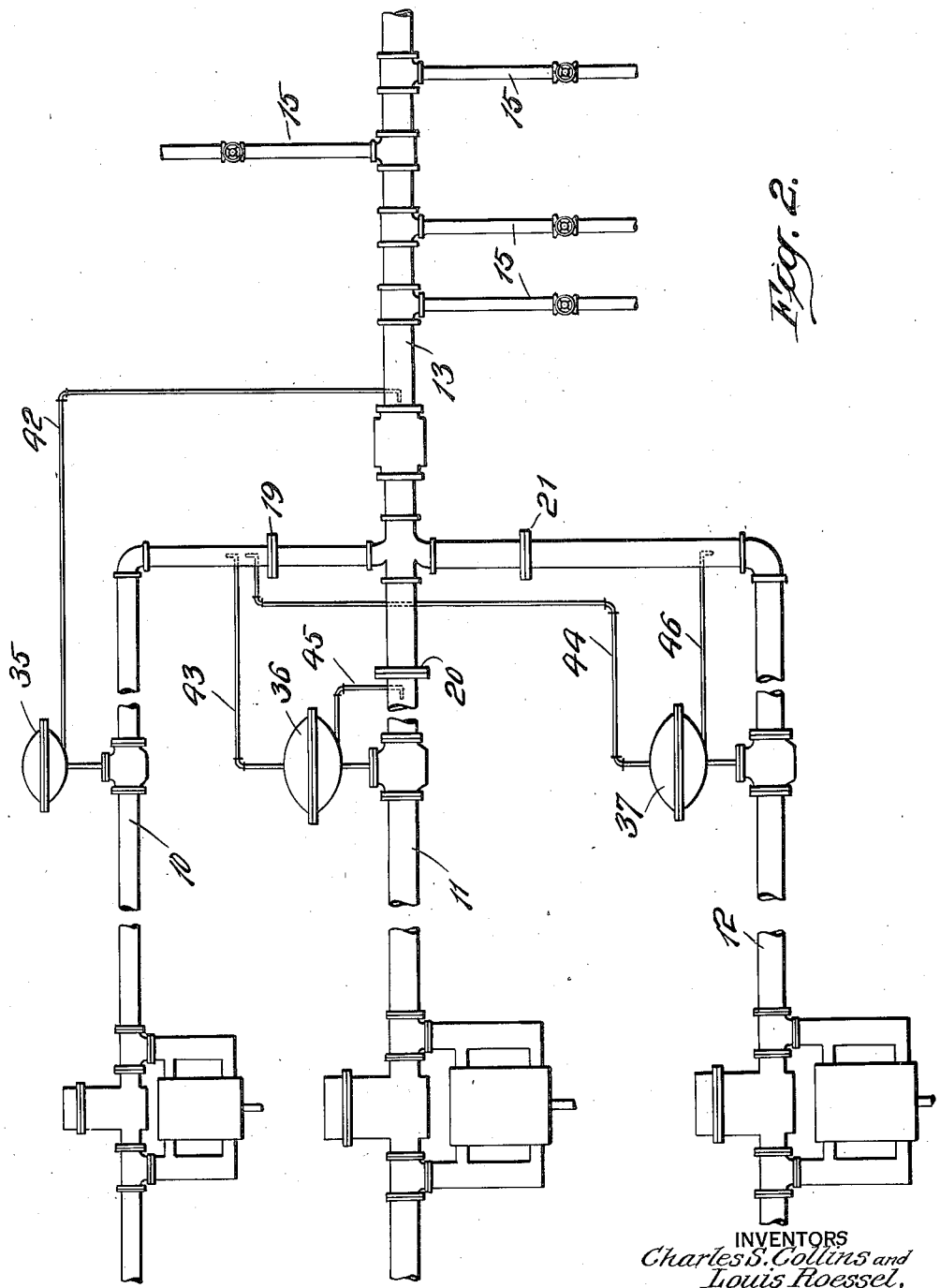

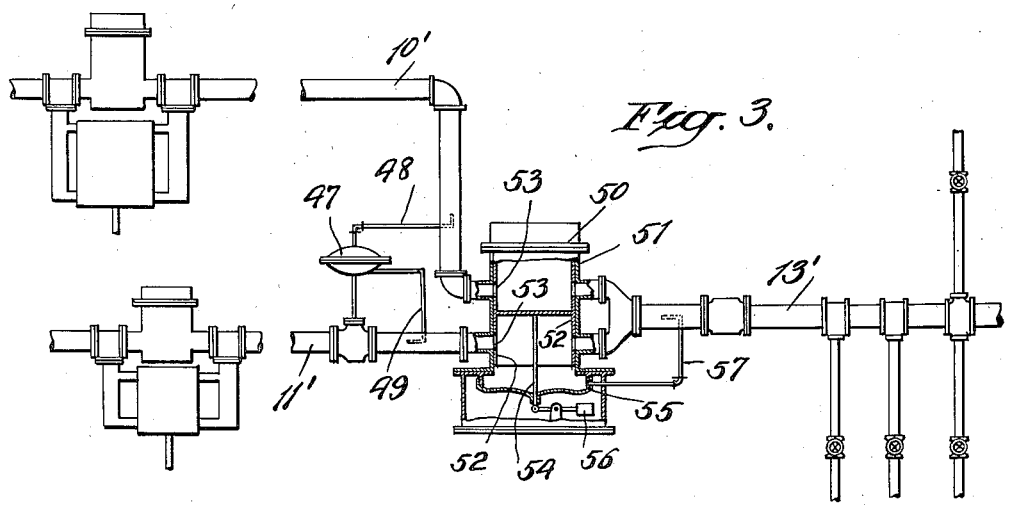
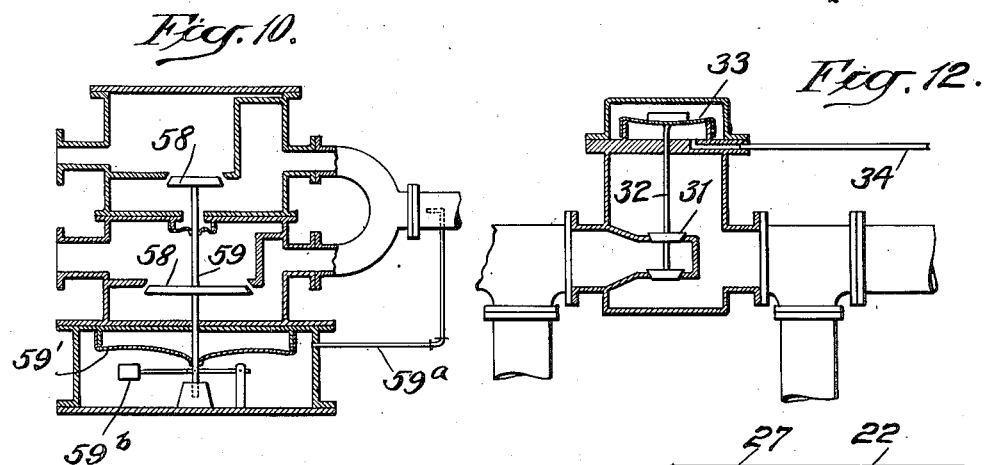
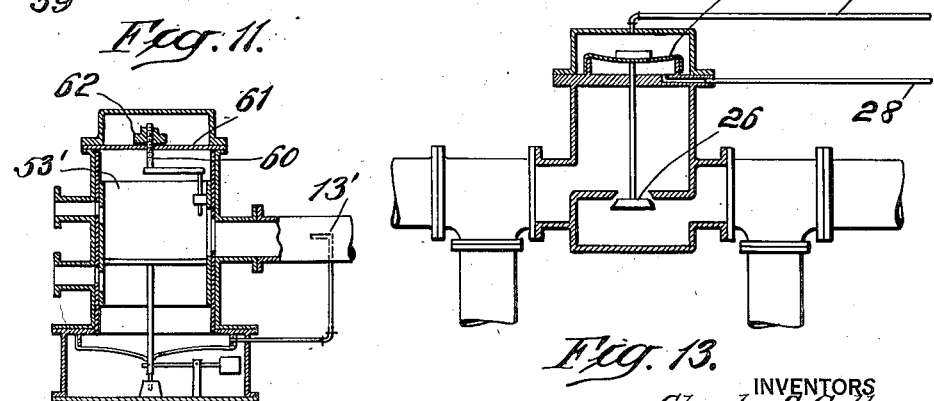

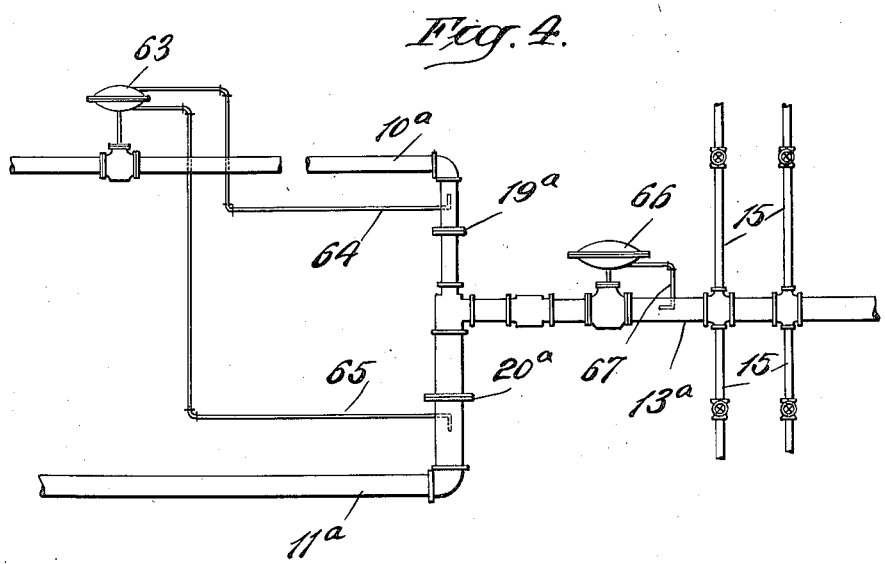
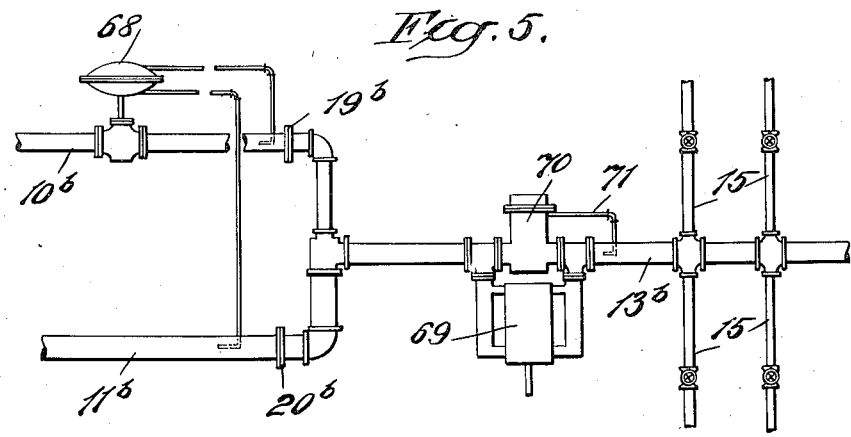

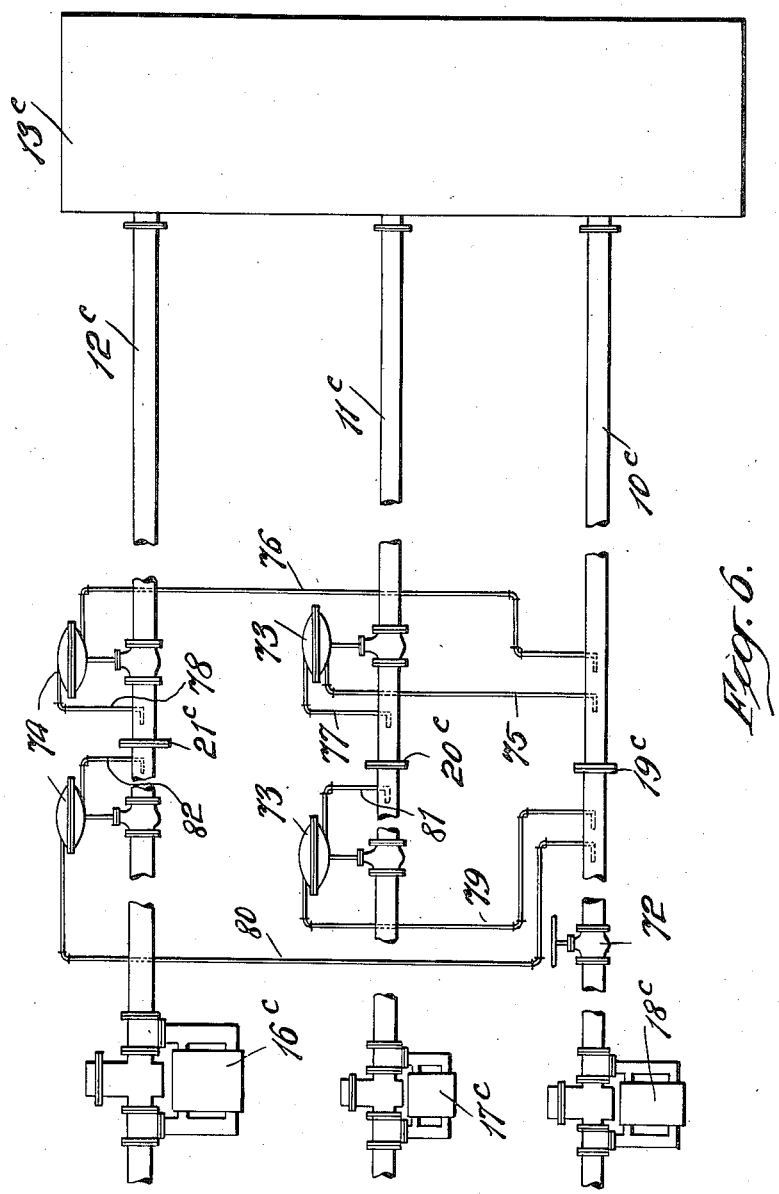

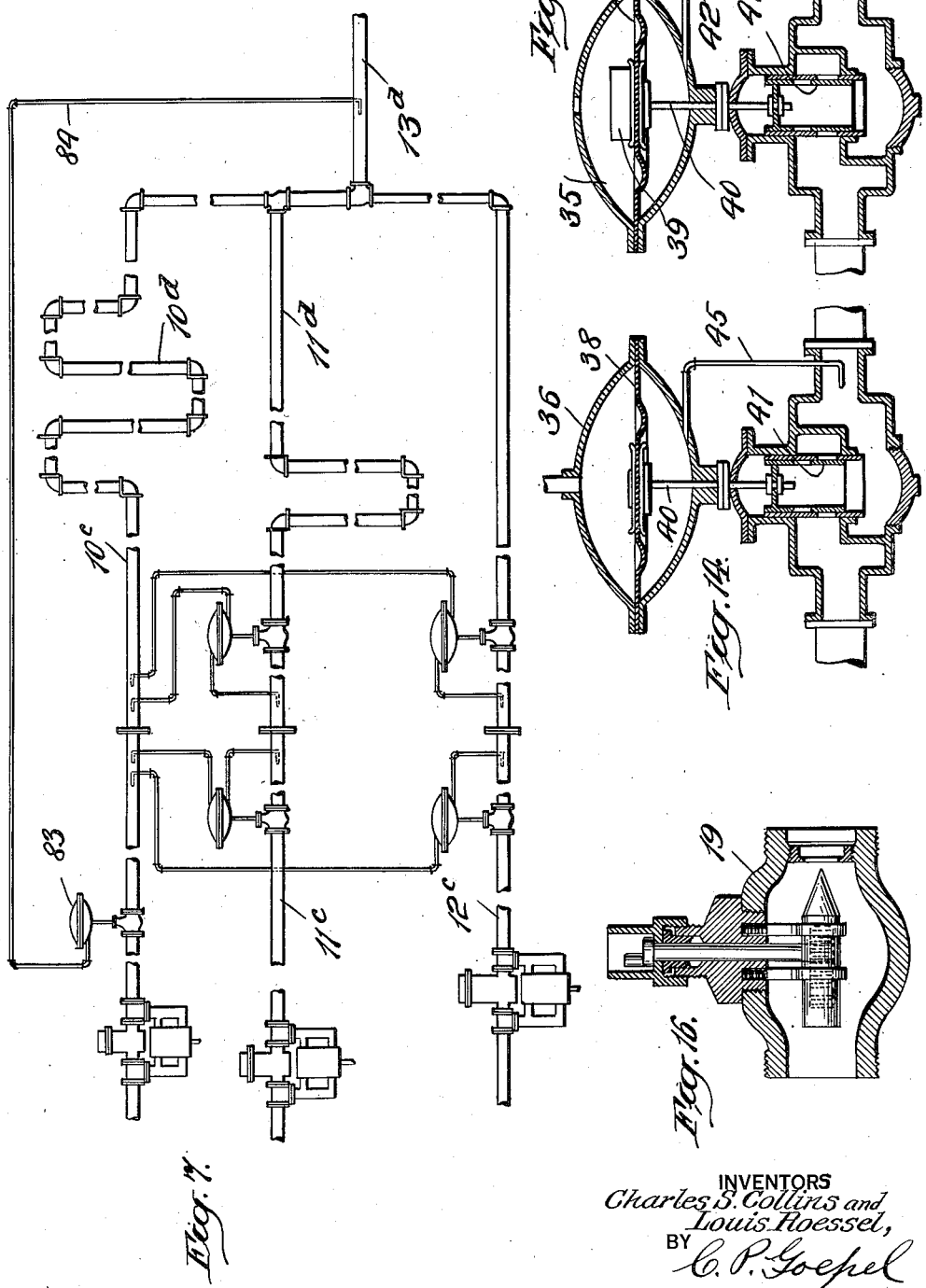

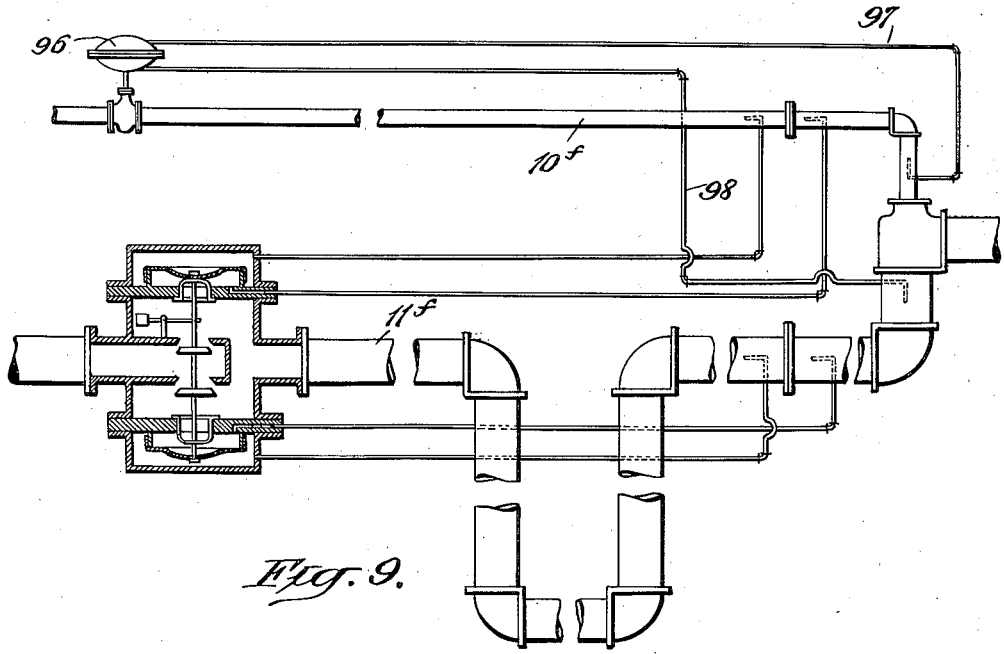
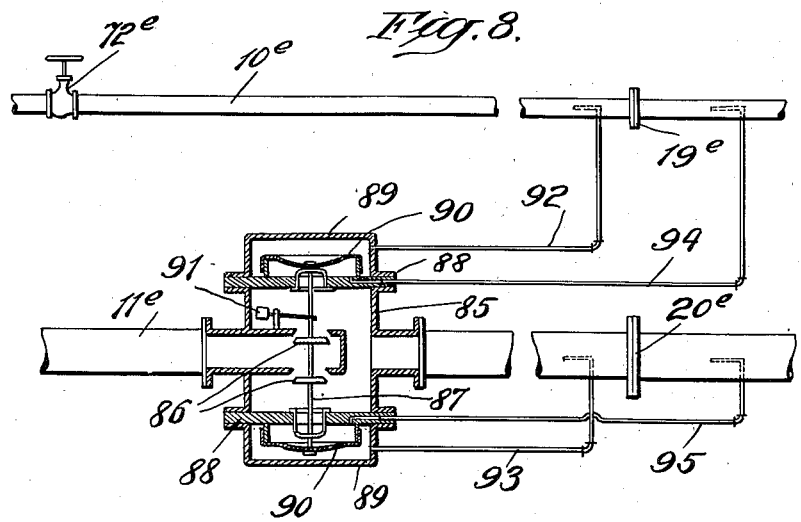

1,452,265

UNITED STATES PATENT OFFICE.

CHARLES S. COLLINS, OF NEW YORK, AND LOUIS ROESSEL, OF BROOKLYN, NEW YORK.

METHOD AND APPARATUS FOR PROPORTIONALLY REGULATING THE FLOW OF FLUIDS.

Application filed April 1, 1919. Serial No. 286,813.

*To all whom it may concern:*

Be it known that we, CHARLES S. COLLINS, a citizen of the United States, and a resident of the borough of the Bronx, city and State of New York, and LOUIS ROESSEL, a citizen of the United States, and a resident of the borough of Brooklyn, city and State of New York, have jointly invented new and useful Improvements in Methods and Apparatus for Proportionally Regulating the Flow of Fluids, of which the following is a specification.

This invention relates to an improved method and apparatus for proportionally regulating the flow of fluids of the character shown and described in Patent No. 1,290,513, granted to us January 7, 1919.

Our present invention, unlike the patented construction just referred to, considered in its generic aspect, aims to maintain a continuous though variable pressure on the common fluid line, regardless of variations in the rates of flow of the several fluids.

The invention contemplates the regulation of the proportional flow of fluids, such as liquids or gases, or a liquid and gas, as the case may be, and in this respect admits of a wide range of modification.

The invention to be hereinafter described is applicable to and particularly designed for the proportional blending of liquids (alcohols and oils), the proportional mixing of gas and liquid ($CO_2$ and water), the proportional mixing of gas with gas (ammonia with air or hydrogen and oxygen), and in all such cases the improved method and apparatus provides means for maintaining a continuous predetermined though variable proportional flow of the several fluids.

In general the invention contemplates the provision of a relatively simple and efficient method and apparatus for proportionally regulating the flow of fluids, and which will be especially accurate for proportionally regulating the flow of different fluids and for other analogous purposes.

Our improved method and apparatus is illustrated in several alternative embodiments in the accompanying drawings, in which similar reference characters designate corresponding parts throughout the several views, and wherein Fig. 1 is a diagrammatic view illustrating one embodiment of the apparatus, whereby the improved method may be successfully practiced.

Fig. 2 is a similar diagrammatic view showing a slightly different arrangement of the apparatus.

Fig. 3 is a diagrammatic view, partly in section, illustrating another embodiment of the invention.

Figs. 4, 5, 6 and 7 are diagrammatic views disclosing other alternative constructions.

Figs. 8 and 9 are fragmentary views, partly in section, of different embodiments of the invention and illustrating a duplex type of pressure compensator for the purpose of compensating the final and initial pressures in the primary and secondary pipe lines.

Fig. 10 is a sectional view illustrating a non-variable type of pressure compensator for maintaining a constant common final pressure.

Fig. 11 is a similar view illustrating a variable type of compensator.

Fig. 12 is a detail sectional view showing the automatic pressure governor in the by pass of the pump for the primary pipe line.

Fig. 13 is a similar detail section illustrating the form of pressure governor for the pumps of the secondary pipe lines.

Fig. 14 is an enlarged detail section of the compensator for the secondary pipe lines.

Fig. 15 is a similar view of the compensator between the primary pipe line and the common line, and Fig. 16 is a detail section illustrating an adjustable type of orifice.

In the accompanying drawings we have illustrated various practical embodiments of the apparatus through the medium of which the improved method to be later described may be successfully practiced. It is, however, to be understood that the disclosures in the drawings are purely illustrative of the improved method, as defined in the subjoined claims, which might also be advantageously employed in connection with other different installations of the pipe lines and conduits, and in which the adjunctive control valves, compensators and pressure governors might be variously modified.

Referring now particularly to Fig. 1 of the drawings, 10 designates a primary pipe line and 11 and 12 two secondary pipe lines which are supplied from different sources with fluids which it is desired to mix. These primary and secondary feed or delivery lines for the different fluids are connected to a common receiving line 13, which may be provided with a mixing chamber indicated at 14, in which the several fluids mix or comingle. Through the pipe line 13, in the construction now under consideration, the mixed fluids flow to a plurality of outlets 15. The different fluids are delivered to the several pipe lines 10, 11 and 12 under an initial pressure, preferably by means of the pumps 16, 17 and 18 respectively, though such initial pressures may also be obtained by gravity head blowers or other means which will serve to impress upon the body of fluid an initial pressure head.

In each of the fluid feed lines there is provided an orifice, such orifices being designated 19, 20 and 21 respectively. These orifices may be either of the fixed or adjustable type. In Fig. 16 we have illustrated an adjustable type of orifice similar to that shown and described in our prior patent hereinbefore referred to and to which reference may be had for a more particular understanding of the detail construction of the adjustable type of orifice. To compensate the pressures in the secondary pipe lines 11 and 12 to the pressure in the primary pipe line 10 the latter pipe line is connected by the pipes 22 and 23 respectively to pressure governors 24 and 25, with which each of the pumps 17 and 18 is equipped. Each of these pressure governors, as shown in detail in Fig. 13 of the drawings, includes a valve 26 which controls the passage of the fluid under pressure from the pump into the secondary pipe line. The stem of the valve is connected at its upper end to a diaphragm 27, and upon the upper side of this diaphragm the pressure fluid is delivered from the primary pipe line 10. The lower side of the diaphragm is connected in each instance by pipes 28 and 29 respectively to the secondary pipe lines 11 and 12. Thus it will be apparent that upon an increase or decrease of pressure in the primary line, the pressures in the secondary lines will increase or decrease correspondingly. Consequently continuous though variable pressures in equal relation to each other are maintained in the primary and secondary pipe lines with any rate of flow of the several fluids. In other words, the rate of fluid flow is constant at fixed pressures and as the pressure is varied, the rate of flow varies accordingly, although remaining constant at the different pressures. Therefore it will be understood that the fluid is at all times under a continuous though variable pressure and this variation in pressure determines the rate of flow through the orifice.

The pump 16 which delivers the fluid to the primary line 10 under initial pressure is also equipped with a pressure regulator as shown in Figure 12, generally indicated at 30, which is arranged in a by-pass connecting the discharge side of the pump to the inlet side thereof. This pressure regulator consists of the spaced valve members 31 fixed upon a rod or stem 32, which extends upwardly to a pressure receiving chamber and is attached to a diaphragm 33. Fluid pressure is let into the chamber against the under side of the diaphragm through a pipe 34, which extends into the common pipe line 13 at a point between the mixing chamber 14 and the outlets 15. It will be apparent from this arrangement that when the pressure in the common pipe line increases or decreases, the pressure beneath the diaphragm 33 will increase or decrease accordingly, thereby moving the valve members 31 towards or from their seats, to thereby maintain a continuous predetermined pressure in the common line. Thus when the pressure in the common pipe line reaches a maximum the regulator valve is automatically opened and the fluid is merely recirculated by the pump from its discharge to its inlet side through the by-pass. When the valve is closed, the fluid is drawn in from the source of supply at the suction side of the pump and delivered under pressure through the delivery pipe to the common discharge pipe.

From the above it will be apparent that as the initial pressures on the primary and secondary feed or delivery lines are maintained in constant relation to each other, and as the fluids from these lines flow through the orifices 19, 20 and 21 to the common line 13, in which the pressure is maintained continuous though variable through the medium of the automatic pressure regulator 30, the fluids from the lines 10, 11 and 12 will comingle in the common line 13 in the volumetric or gravimetric proportions of the areas of the fixed or adjustable orifices. When one or more of the outlets 15 are opened or closed, the pressure in the common line 13 will, of course, decrease, but by the control of the initial pressure on the primary line 10, and by compensating the pressures in the secondary lines to the pressure in the primary line as above described, the proportions of the fluids flowing through these lines will at all times remain the same, although the rate of flow will vary.

In Fig. 2 of the drawings we have shown a slightly different form of the invention wherein the purpose in view is attained by the regulation and control of pressures in the lines 10, 11 and 12 at an intermediate point instead of at the pump, blower or other point of initial pressure. To this end we provide the pressure regulators in the pipe lines 10, 11 and 12, which are designated 35, 36 and 37 respectively. The pressure regulator 35 for the primary pipe line is seen in detail in Fig. 15 of the drawings and includes a diaphragm 38 secured within a pressure receiving chamber and having a weight 39 centrally secured to its upper side. The diaphragm is connected by a vertically movable rod 40 to a pressure compensating or regulating valve 41. A pipe 42 connects the lower side of the diaphragm casing to the common pipe 13, so as to variably control and regulate the passage of the fluid under pressure from the pump through said line, in accordance with variations in pressure which may from time to time occur in the common line 13. The pressure regulators 36 and 37 for the secondary pipe lines are of similar construction, with the exception that the weight 39 is omitted and the upper sides of the diaphragm casings are connected by pipes 43 and 44 respectively to the primary pipe line 10 at a point between the orifice 19 and the pressure regulator 35. The lower sides of the casings 36 and 37 are connected by pipes 45 and 46 respectively to the respective secondary pipe lines at points in advance of the orifices 20 and 21. The valves 41 for these pressure regulators or compensators, though preferably of the construction disclosed in our prior patent, may be of any other desired type.

It will be readily understood that in the operation of this modified form of the apparatus, the same desirable result is secured, namely, a continuous, predetermined though variable pressure is maintained in the common line regardless of variations of the rate of flow of the different fluids. This is done by maintaining an intermediate pressure in each of the pipe lines 10, 11 and 12 between the orifice therein and the regulator or compensator which is equal to or less than the initial pressure and is equal to or greater than the pressure in the common line 13. Consequently, therefore, the intermediate pressures in these lines will bear a constant relation to each other and as the fluids flow through the orifices to a continuous though variable pressure in the common line, the several fluids will comingle in the volumetric or gravimetric proportions determined by the areas of the respective orifices. Thus, the fluid mixture flowing through any one or more of the outlets 15 when the latter are open will remain in constant proportion, notwithstanding that the rate of flow of the fluids through the several pipe lines may constantly vary.

In Fig. 3 we have illustrated another arrangement wherein the fluids flow through two supply lines 10' and 11' respectively, such fluids being delivered under initial pressure by means of a suitable pressure pump or analogous means and flow into the common pipe line 13' where they become mixed or comingled.

The pressures in the pipe lines 10' and 11' are compensated to each other by means of the compensator 47 shown in detail in Fig. 14, the upper side of the diaphragm casing being connected by a pipe 48 to the primary pipe line 10', while the lower side of said casing is connected by the pipe 49 to the secondary pipe line 11'. In this form of our apparatus we employ a compensator or pressure regulator 50, which is interposed in the primary and secondary pipe lines and includes a suitable casing 51, to opposite sides of which the pipe lines are connected. Within this casing the sliding valve member 52 is arranged, said valve member having ports 53 to coincide with the pipe line connections. The valve member is provided with a stem 54, the lower end of which is centrally attached to the diaphragm 55. A pivotally mounted counter balancing weight 56 is also centrally connected to the diaphragm. Pressure is delivered upon the upper side of the diaphragm from the pipe line 13' through a pipe 57. It will be seen from this construction that if the pressure from the common pipe line 13' acts against the diaphragm, the valve member is moved downwardly to more or less close the passage of the fluids through the orifices 53. When the pressure in the pipe line 13' decreases, the counterbalancing weight 56 acts to move the valve upwardly, so that the rate of flow through the primary and secondary pipe lines is increased and the pressure in the pipe line 13' thus maintained continuous. It will likewise be apparent that as the pressures on the pipe lines 10' and 11' are compensated to each other, and the rate of flow is controlled by variations in pressure in the line 13', the fluids flowing through the ports 53 and mixing in the common pipe line will maintain the same relative proportions regardless of variations in pressure in the common line whereby the rate of flow is controlled. Thus, in this case likewise the mixed fluids flowing through the outlets 15 will at all times remain in constant proportion relative to each other.

In Fig. 10 of the drawings we have illustrated a non-adjustable type of the regulator, which is quite similar, insofar as its mode of operation is concerned to that shown in Fig. 3. In this construction, however, instead of the sleeve type of control valve the spaced valve disks 58, preferably of relatively different diameters, are employed, said disks being fixed upon a common valve stem or rod 59. The lower end of the valve rod is centrally connected to a diaphragm 59' and pressure is admitted to the under side of this diaphragm from the common pipe line through the pipe 59ª. A counter balancing weight 59ᵇ connected to the lower end of the valve rod 59 normally acts to move the valve disks 58 to their open positions. Upon an increase in pressure in the common line, such pressure acting against the under side of the diaphragm 59' moves the valve disks toward their closed positions, thus controlling the flow of the different fluids through the primary and secondary supply lines to the common line, whereby a continuous though variable pressure will be maintained in the latter.

In Fig. 11 of the drawings we have disclosed a variable type of the regulator wherein the sliding valve 53' is movable relative to a guide arm 60, said arm having an upwardly extending portion threaded in a bar or plate 61, and upon which a lock nut 62 is engaged. By loosening this nut and turning the arm 60, the sleeve valve 53' may be circumferentially adjusted to position the ports therein relative to the inlet connections for the different fluids. Such variable proportions of the different fluids entering through the valve into the common line remain relatively the same in all vertical positions of the valve, though the rate of flow and the pressure may constantly vary.

In Fig. 4, which illustrates another alternative embodiment of the apparatus, $10^a$ and $11^a$ designate the primary and secondary fluid supply lines which are connected to the common line $13^a$ in which the fluids are mixed or comingled. The lines $10^a$ and $11^a$ are respectively provided with orifices $19^a$ and $20^a$ of the fixed or adjustable type. The fluids are delivered to the supply lines under pressure and the supply line $10^a$ is provided with a regulator 63 of the type shown in Fig. 14 of the drawings, the upper side of the diaphragm casing being connected by a pipe 64 to the pipe line $10^a$ and the lower side of the casing being connected by a pipe 65 to line $11^a$. This pressure regulator serves to maintain an intermediate pressure in the section of the supply pipe $10^a$ between the orifice $19^a$ and the regulator, which is equal to or in constant relation to the pressure of the secondary line $11^a$. The pressure on the common pipe line $13^a$ in this case is likewise maintained continuous though variable by means of the regulator 66, which is of the type illustrated in Fig. 15 of the drawings and wherein the lower side of the casing is connected by the pipe 67 to the pipe $13^a$. Therefore, it will be apparent that upon an increase or decrease of pressure in the common pipe line when one or more of the outlets 15 is opened, through the medium of the regulator 66, the rate of flow through the supply lines will be increased or decreased correspondingly and a continuous pressure thus maintained in the common line, and as the pressures in the supply lines are compensated relative to each other, the fluids will flow through the pipe lines in the proportions determined by the area of their orifices $19^a$ and $20^a$. Thus the mixed fluids issuing from the outlet pipes connected to the line $13^a$ will remain in constant proportion irrespective of the rate of flow.

Fig. 5 illustrates still another alternative embodiment of our invention, wherein the supply lines $10^b$ and $11^b$ are equipped with pressure compensating or regulating means, as in Fig. 4, including the regulator 68 for actuating the fluid control valve in the pipe line $10^b$.

In this arrangement the common pipe line $13^b$, in which the fluids mix or comingle, is equipped with a pump 69, having a pressure regulating or controlling valve 70, which is similar in its detail construction to the regulator shown in Fig. 12 of the drawings, and wherein pressure is delivered against the under side of the diaphragm of the by-pass regulator through the pipe 71, which is connected to the pipe line $13^b$. Thus, without reiterating, it will be at once understood that in this instance likewise a continuous though variable pressure is maintained in the common line $13^b$ and the fluids are delivered from said line through any one or more of the outlets in the same constant relative proportions regardless of the rate of flow.

In Fig. 6 of the drawings another arrangement is shown wherein a primary pipe line $10^c$ and secondary pipe lines $11^c$ and $12^c$ discharge into a common receiving chamber or tank $13^c$. These fluid supply lines may, however, lead to a common line, as in the previously described forms of the apparatus or to any other point where the outlet pressures from these lines are discharged against unequal pressure heads. The fluids are delivered under pressure to the three pipe lines through the medium of the pumps $16^c$, $17^c$ and $18^c$ respectively, or by means of gravity heads, or blowers, as may be desired. The pipe lines are further provided with orifices of the fixed or adjustable type, herein designated $19^c$, $20^c$ and $21^c$ respectively. The pressure on the primary line $10^c$ is manually controlled by means of a suitable hand valve shown at 72, so as to maintain the required rate of flow through the orifice $19^c$. The pressures on the secondary lines $11^c$ and $12^c$ are regulated from the primary line by means of the regulators or compensators 73 and 74 respectively, each of which is of the type shown in Fig. 14, of the drawings. By means of these regulators, the pressure on the secondary lines is at all times equal to or in constant relation to the pressure on the primary line. The pressure in the primary line will, of course, vary at the discharge side of the orifice $19^c$, in accordance with variations in the pressure head in the tank or container 13ᶜ, or through frictional resistance. The pressure on the discharge side of the orifices in the secondary pipe lines are regulated by means of the compensators above referred to, so that they are equal to or in constant relation to the pressure on the discharge side of the orifice in the primary line, regardless of possible variations in the rate of flow.

As shown, compensators 73 and 74 are arranged at the inlet as well as the outlet sides of the orifices in the secondary pipe lines, and pressure is delivered from the primary line against the lower side of the diaphragm of the compensators arranged at the outlet sides of the orifices by means of pipes 75 and 76, respectively, pressure being delivered against the upper sides of said diaphragms from the respective secondary pipe lines by the pipes 77 and 78. Pressure is likewise delivered from the primary pipe line against the upper sides of the diaphragms of the compensators arranged at the inlet sides of the orifices by the pipes 79 and 80 respectively and against the lower sides of the diaphragms from the secondary pipe lines by the pipes 81 and 82.

From the above it will be apparent that as the pressures on the inlet sides of the several orifices are in equal or in constant relation to each other, and as the pressures on the outlet or discharge sides of the orifices are likewise in equal or in constant relation to each other, the fluids will flow through the several lines in the same volumetric or gravimetric proportions, and regardless of the varying rates of flow, and will mix or comingle in the tank, container or common receptacle 13ᶜ in constant and invariable relative proportions, irrespective of pressure variations at the discharge ends of the lines.

Fig. 7 shows the same arrangement of the pressure compensators or regulators as in Fig. 6, but in lieu of the hand valve 72 in the primary pipe line a pressure regulator 83 of the construction shown in Fig. 15 is provided and connected by the pipe 84 to the header or common line 13ᵈ. Also in this embodiment of the apparatus we have provided resistance turns or bends 10ᵈ and 11ᵈ in the primary line and the first secondary pipe line, so that the fluid will flow through the three pipe lines under variable pressures due to the increased frictional resistance caused by the pipe ends. However, as the pressure on the primary pipe line is regulated and controlled automatically upon the occurrence of an increase or decrease of pressure in the common line, and as the pressures in the primary and secondary lines are compensated to each other, a continuous though variable pressure will be maintained in the common line.

In Fig. 8 we have illustrated what may be termed a duplex type of pressure compensator arranged in the secondary pipe line 11ᵉ. The initial pressure on the primary pipe line 10ᵉ is controlled by the hand valve 72ᵉ. Each pipe line is further provided with an orifice 19ᵉ and 20ᵉ respectively of the fixed or adjustable type.

The compensator above referred to includes a suitable casing 85, having a by-pass controlled by the valves 86 fixed upon a common rod or stem 87. 88 indicates heads at the opposite ends of the casing 85, each head having a pressure receiving chamber 89. A diaphragm 90 is arranged in each of the chambers 89 and to the respective diaphragms the opposite ends of the valve rod 87 are connected. 91 indicates a counterbalancing weight suitably mounted and arranged within the casing 85 and connected to the valve rod. This weight normally acts to move the valve disks 86 to their closed positions and cut off the flow of the fluid through the by-pass from one section of the pipe line to the other.

Pressure is delivered from the inlet side of the orifice 19ᵉ in the primary pipe line against the upper side of the upper diaphragm 90 through a pipe 92, while pressure is delivered against the lower side of the lower diaphragm from the inlet side of the orifice 20ᵉ in the secondary pipe line through a pipe 93. A pipette 94 delivers the fluid under pressure from the discharge side of the orifice 19ᵉ in the primary line against the under side of the upper diaphragm 90, while a pipe 95 delivers pressure from the discharge side of the orifice 20ᵉ in the secondary line against the upper side of the lower diaphragm 90. By reason of these counteracting pressures against the diaphragms delivered from the inlet and outlet sides of the orifices, these pressures will bear a constant relation to each other and the fluids will flow from the orifices to the common line or receptacle in the same gravimetric or volumetric proportions as the area of the orifices, regardless of the rate of flow.

In Fig. 9 we illustrate an arrangement wherein the hand valve 72ᵉ is eliminated and a pressure regulator 96 of the type shown in Fig. 14 is arranged in the primary pipe line 10ᶠ. Pressure is delivered against the upper side of the diaphragm of said regulator from the final pressure in the primary line through the pipe 97, and a pipe 98 delivers a counteracting pressure against the under side of the diaphragm from the final pressure in the secondary pipe line 11ᶠ. In the secondary line, a duplex pressure compensator of the construction shown in Fig. 8 is arranged. It will be apparent that as the final pressure on the primary line acts on the upper side of the diaphragm of the regulator 96 and the final pressure in the secondary line acts on the under side of this diaphragm, equal final pressures will be maintained in the primary and secondary lines. However, it is possible to maintain pressures in any desired relation in these lines by the use of a multiple diaphragm compensator, or any desired predetermined pressure may be maintained in the primary line or in a common line by using a pressure controller or regulator where the pressure acts on the under side of the diaphragm in opposition to a weight or spring, similar to the construction disclosed in Fig. 15 of the drawings.

From the foregoing description considered in connection with the accompanying drawings, the several illustrated embodiments of the apparatus, as well as the practical advantages resulting from the use thereof in connection with our improved method, will be readily perceived.

In each of the Figures 1 to 5 of the drawings we have disclosed the apparatus as provided in the common line with a mixing chamber 14. It is manifest, however, that this chamber may be dispensed with and that it might also be desirable to deliver the several fluids separately to the point of utilization. It will further be apparent that while in some cases we have shown two fluid supply and delivery lines, and in other cases we have illustrated three such lines, the invention is in no sense to be limited to such a specific number, as any desired multiple of supply lines may be provided, depending altogether upon the number of different fluids which are to be mixed together. It is accordingly to be understood that as our invention may be exemplified in many different forms of apparatus without substantially departing from the salient features of our improved method, we reserve the privilege of adopting all such legitimate modifications as may be fairly embraced within the spirit and scope of the appended claims.

We claim:

1. The method of regulating the proportional flow of fluids through orifices which consists in maintaining pressure variations through the orifices equal to or in constant relation to each other and controlling the initial pressures on the fluids from the final pressure.

2. The method of regulating the proportional flow of fluids through orifices which consists in maintaining on opposite sides of each orifice pressure variations equal or in constant relation to the pressure variations at the other orifices and thereby maintaining a continuous, predetermined, common, final pressure on the fluids.

3. The method of regulating the proportional flow of fluids through orifices which consists in maintaining on opposite sides of the orifices pressure variations equal or in constant relation to each other and controlling the initial pressures on the fluids in accordance with the final pressure.

4. The method of regulating the proportional flow of fluids through orifices which consists in maintaining on opposite sides of the orifices pressure variations equal or in constant relation to each other, maintaining a continuous, though variable, common final pressure on the fluids and controlling the initial pressures in accordance with variations in the final pressure.

5. The method of regulating the proportional flow of fluids through orifices which consists in keeping the pressure drops through the orifices equal or in constant relation to each other and controlling the initial pressures on the fluids in accordance with variations in the final pressure.

6. The method of regulating the proportional flow of fluids which consists in compensating the pressures in delivery pipes to the pressure in a common pipe and thereby maintaining a continuous predetermined, final pressure in the common pipe.

7. The method of regulating the proportional flow of fluids which consists in compensating the pressures in primary and secondary delivery pipes to each other, maintaining continuous pressure in the common pipe, and controlling the primary pipe pressure from the pressure in the common pipe.

8. The method of regulating the proportional flow of fluids which consists in maintaining pressure variations in primary and secondary delivery pipes through variable adjustable orifices in equal or in continuous relation to each other and compensating the pressures in the delivery pipes to the pressure in a common pipe.

9. The method of regulating the proportional flow of fluids through orifices which consists in maintaining at opposite sides of the orifices pressure variations equal or in constant relation to each other and controlling the initial pressures on the fluids in accordance with variations in the final pressure and thereby maintaining a continuous, though variable, final common pressure on the fluids to control the rate of flow through the orifices.

10. The method of regulating the proportional flow of fluids which consists in compensating the pressures in delivery pipes connected to different fluid sources to the pressure in a common pipe receiving the different fluids, controlling the initial pressures in the delivery pipes from the pressure in the common pipe, and maintaining a continuous, though variable, final pressure in the common pipe by controlling the rate of flow through the delivery pipes.

11. The method of regulating the proportional flow of fluids through orifices which consists in maintaining initial pressures upon a plurality of fluids in equal or constant relation, maintaining a final variable common pressure on the fluids so as to control the rate of flow of the several fluids through said orifices arranged between the initial and final pressures, and controlling the initial pressures in accordance with variations in the final pressure to thereby maintain a continuous final pressure irrespective of the rate of flow.

12. The method of regulating the proportional flow of fluids which consists in compensating the pressures in delivery pipes connected to different fluid sources to the pressure in a common pipe receiving the different fluids, maintaining a final variable pressure in the common pipe, and controlling the delivery pipe pressures in accordance with variations in the final pressure to thereby maintain a continuous final pressure irrespective of the rate of flow.

13. A proportioning regulator for fluids comprising a plurality of orifices through which the several fluids flow from initial to final pressures, means for regulating the initial pressures in equal or constant relation to each other, and means for automatically controlling the initial pressure in accordance with variations in the final pressures to thereby maintain a continuous common final pressure on the fluids.

14. A proportioning regulator for fluids comprising a plurality of delivery pipes connected to different fluid sources, means for positively compensating the pressures in said delivery pipes to each other, a common pipe to which the delivery pipes are connected, and means for positively controlling the pressures in the delivery pipes by the pressure in the common pipe.

15. A proportioning regulator for fluids comprising a plurality of delivery pipes each discharging through an orifice to a common pipe, means for positively compensating the pressures in said delivery pipes and maintaining such pressures in constant relation to each other as the fluids flow through said orifices, said common pipe having a mixing chamber and a plurality of outlets, and means for maintaining a continuous, though variable, pressure in said common pipe whereby the flow of the fluids through the outlets will remain in constant, relative proportions irrespective of the rate of flow.

16. A proportioning regulator for fluids comprising a plurality of delivery pipes, each having an orifice, and means for compensating the pressures in the delivery pipes to each other at the inlet and outlet sides of the orifice.

17. A proportioning regulator for fluids comprising a plurality of delivery pipes, means for compensating the initial and final pressures in said pipes in equal or constant relation to each other, and means for automatically controlling the initial pressures in the respective delivery pipes in accordance with the increase or decrease of the final pressure to thereby maintain a continuous, though variable, final pressure on the fluids.

18. A proportioning regulator for fluids, comprising a plurality of delivery pipes connected to a common pipe, means for compensating the pressures in the delivery pipes to each other, and means for varying the rate of flow of the fluids in accordance with variations in pressure in the common pipe to thereby maintain a continuous final pressure on the fluids to discharge the fluids from the common pipe in constant proportions irrespective of the rate of flow.

19. A proportioning regulator for fluids comprising primary and secondary pipe lines, each having an orifice through which the fluids flow from initial to final pressure, compensators arranged in the secondary pipe lines at the inlet and outlet sides of the orifices and respectively connected to the primary pipe line at the inlet and outlet sides of the orifices therein to positively compensate pressures to each other at the inlet and outlet sides of the orifices whereby the fluids are delivered from the pipe lines in constant, relative proportions irrespective of the rate of flow.

20. The method of regulating the proportional flow of fluids which consists in maintaining pressure variations in primary and secondary delivery pipes through variable adjustable orifices in equal or in constant relation to each other and compensating the pressures in the delivery pipes to the pressure in a common pipe.

In testimony that we claim the foregoing as our invention, we have signed our names in presence of a subscribing witness.
CHARLES S. COLLINS.
LOUIS ROESSEL.
Witness:
M. C. LYDDANE.